United States Patent [19]

Ferrara

[11] 4,145,225
[45] Mar. 20, 1979

[54] METHOD OF MODIFYING THE PROPERTIES OF CEREAL FLOURS AND THE MODIFIED FLOURS SO PRODUCED

[76] Inventor: Peter J. Ferrara, Ridge Rd., Cornwall, N.Y. 12518

[21] Appl. No.: 819,600

[22] Filed: Jul. 27, 1977

[51] Int. Cl.² .............................................. C08L 89/00
[52] U.S. Cl. ................................ 106/154 R; 106/124; 260/17.2; 260/17.3; 260/123.5; 536/48
[58] Field of Search ........................... 106/154 R, 124; 260/123.5; 536/48

[56] References Cited

U.S. PATENT DOCUMENTS 2,923,691  2/1960  Young et al. ..................... 260/123.5

*Primary Examiner*—Harold D. Anderson

[57] ABSTRACT

Increasing the viscosity and smoothness of cereal flour pastes by treating the milled cereal flours, prior to pasting, with cyanide.

7 Claims, No Drawings

METHOD OF MODIFYING THE PROPERTIES OF CEREAL FLOURS AND THE MODIFIED FLOURS SO PRODUCED

This invention relates to cereal flours, illustrated by corn, rye, milo and wheat; and more particularly to means for improving the physical properties of such flours.

Cereal flours and cereal starches have wide commercial usage. In addition to their food uses, these materials find wide acceptance in the adhesive and glue industry. Two of the properties of such products which strongly influence their utility are the viscosity and adhesive characteristics of the gelatinized pastes which are produced when they are moistened with water and heated. Another property of importance is the smoothness of the paste.

Cereal starches are produced by wet milling processes which are rather elaborate because they are designed to separate purified starch from the bran, germ and fiber respectively of the cereal. Even though the production processes are more elaborate and therefore inherently more expensive, they produce a product which far outsells the less costly dried cereal flours at least partly because the starch paste viscosities are substantially higher than are the flour paste viscosities. Moreover, in addition to being somewhat watery, flour pastes lack the smoothness of starch paste.

Many attempts, some quite successful, have been made to modify cereal flours in order to improve their properties and therefore their marketability. Acid modification of cereal flours has produced reduced viscosity products which have a substantial use in the manufacture of adhesives and gypsum wall board. Aging cereal flours with alkali catalysts for extended periods, up to about 7 days, and subsequently treating such aged flours with alkylene, especially ethylene and/or propylene, oxides to cross link such, has produced excellent derivatives for use in paper coatings.

A large potential market exists for cereal flour pastes in paper board and plywood adhesives. This potential has not been achieved because cereal flour pastes are often lacking in the desired characteristics of starches, including viscosity, tackiness, smoothness and sometimes, color.

It is therefore an important object of this invention to provide means for improving these physical properties of cereal flours. It is a further object of this invention to utilize such improved cereal flours in formulating glues and adhesives. Other and additional objects of this invention will become apparent from a consideration of this entire specification including the claims hereof.

In accord with and fulfilling these objects, this invention resides, in one aspect thereof, in treating cereal flours with cyanide moieties. In a preferred aspect, the proportion of HCN or its equivalent is about 500 to 10,000 ppm based on the weight of the flour; most preferred is a proportion of about 750 to 4000 ppm. Treating temperature is suitably about 2 to 40 degrees celsius, preferably about room temperature. Treating time is a function of cyanide proportion and temperature. Usual times are about 10 minutes or longer. Time is not critical.

While it is not known exactly what chemical effect the cyanide moiety has on the cereal flour, this invention shows that treatment of cereal flours either directly with HCN gas or with the gaseous product produced by acid decomposition of alkali metal or alkaline earth metal cyanides, usually in water solutions, has a remarkably salutary effect upon the paste viscosities of such flours. For example, 60 grams of a no. 2 grade of wheat clears, derived from soft wheat having 11.4 percent protein, 1.24% mineral ash and 11.9% moisture, slurried in 450 grams of water was determined to have a maximum paste viscosity (as measured with an Amylo/Visco/Graph made by C. W. Brabender and Co.) of 210 BU (Brabender Units) measured with a 700 cm G cartridge. The peak paste viscosity was reached at 87–88 degrees celsius. Another sample of the same flour was placed in a covered 5 gallon plastic container and treated with HCN gas according to the following procedure. One kilo (1000 grams) of flour was spread on a circular screen covered with a fine mesh nylon. The flour and screen (cut to the diameter of the container) was positioned 6 inches from the bottom of the container. The container with the flour was at a temperature of 2 degrees celsium. In the space below the flour an aqueous solution of 10% NaCN occupied a shallow glass tray. From the outside of the container, a 40% solution of $H_2SO_4$ was added to the NaCN to produce 23 grams of HCN as a gas. The 23 grams of HCN gas was enough to fill the container assuming none was lost. Since substantially all the gas derived from the HCN generator had to pass through the bed of flour, the quantity of HCN gas potentially in contact with the flour represented 2.3% of the weight of flour. Sixty gram flour samples were taken at the end of the first 60 minutes of flour exposure, and thereafter every two hours for eight hours, and then at each twenty four hour period until a total of eight samples of 60 grams each were taken. The flours were tested in the above AMYLO/VISCO/GRAPH by the same procedure and within a 9 hour period (sample No. 5), the flour paste viscosities reached a maximum value of 420 BU, twice the original values. Subsequently the tests were repeated allowing each treated flour sample to stand and thus ventilate at least 16 hours to ascertain if the higher viscosity readings might have been the result of absorbed or retained HCN. The results of repeating these tests after such interval were consistent with those reported above which indicated that the changes caused by the HCN gas treatment were within the flour and not as a result of HCN residues brought to the AMYLO/VISCO/GRAPH.

With the value of 420 BU having been obtained as the maximum with HCN treatment of this particular flour under these treating conditions, the next series of experiments was designed to establish how much HCN was required to bring about the changes in viscosity attributed to the action of HCN. To accomplish this, flours were placed in a HOBART MIXER, and while the flour was being agitated with a wire wisk, varying amounts of 10% aqueous solutions of NaCN were added. Using this same no. 2 clear flour, the addition of 0.20% NaCN on a flour solids basis achieved viscosity results which exceeded those achieved when the flours were directly treated with HCN gas. The peak flour viscosity value of 440 BU was reached. The peaks were reached at temperatures of about 91–92 degrees celsius. The flours treated with NaCN solutions produced these peak values within 2 hours of applying the NaCN solutions. The pH of the original flour was 6.2 which is sufficiently on the acid side to liberate HCN upon contact with the NaCN. It may be determined that 1 part by weight of NaCN will form approximately ½ part by weight of HCN.

When these flours were air dried to remove by ventilation any residual HCN, it was found that the viscosities of the flours continued to increase for another 48 hours until the flour treated with 0.20% NaCN had reached a viscosity of 740 BU, and the one treated with only 0.10% NaCN showed a peak of 680 BU. Thereafter, the flour peak viscosities remained substantially unchanged. The reason for this gradual and persistant increase in viscosity is not understood. It is entirely possible that during the prolonged exposure to even the small amounts of residual HCN, other and/or additional modifications in the flour were accomplished.

It is clear, from applying GUAIACOL solutions to the treated flours pursuant to the usual qualitative tests for enzymes, that the HCN treatment did not appear to eliminate much of the total enzyme systems, certainly not as much of the enzymes as can be removed by steaming. After HCN treatment, the qualitative enzyme levels in most cases appear to be about the same as before. The shape of the viscosity curves and the rapid increase in viscosity as the pastes neared the gelation temperature, however, did suggest a substantial reduction in amylolytic enzymes, and possibly a decrease in some oxidases. Neither of these has been confirmed quantitatively.

In order to try to achieve the ultimate viscosity potential of this No. 2 wheat clear, by completely destroying or inactivating all of its enzymes, the same wheat clears were checked as to pasting properties in the presence of water containing silver nitrate at 800 PPM based on the flour. The "total inactivation" of enzymes (this has been reported to occur with salts of mercury and silver), resulted in an increase of paste viscosity to 750 BU, only 10 BU greater than the peak obtained from the treatment with the 0.2% NaCN as a solution. While not wishing to be bound by any particular theory of operation, it may be that only a small portion of the enzymes act to reduce the viscosity of wheat flour pastes, and it is these particular enzymes which are eliminated or in some way deactivated through the treatment of flours with cyanide.

One other determination was made in an attempt to substantiate that viscosity reducing enzymes were eliminated by cyanide treatment. This test involved steam heating the flour in accordance with issued U.S. Pat. No. 3,519,441. After steaming, it was concluded that the destruction of flour enzymes was as complete as that obtained by treatment with heavy metallic ions such as mercury or silver.

The investigations described herein are especially concerned with pastes of flour slurries. However, many of the publications of private investigators have been mainly concerned with wheat flour doughs. Therefore tests were run to determine if in converting wheat flour into a dough, well developed and thoroughly mixed for 20 minutes, the stretching of the dough had any effect on the amylolytic enzyme systems. Thus, a proper elastic flour dough was made, and the dough converted into an aqueous slurry by adding water until the usual weight ratio of 60 flour to 450 water was obtained. A viscosity check on the AMYLO/VISCO/GRAPH showed only a moderate increase in flour peak viscosity, from 210 BU (the original flour peak) to a value of 240 BU. This might indicate either some slight disappearance or deactivation of the amylolytic enzymes, or perhaps a slight activation of the proteolytic enzymes.

From a private communication from the USDA Laboratory in Peoria, Illinois it was learned that the investigations concerning the action of the "in situ" or indigenous enzymes reported by Rose M. Ward and J. E. Gastineau (in Cereal Chemistry; Vol. 42, No. 4, July 1965 pages 421–428 titled "ENZYMATIC MODIFICATION OF WHEAT FLOUR FOR PAPER SIZING") was applied successfully to soft wheat clears, but failed to deliver similar amylolytic action when hard wheat flours were substituted for soft wheat clears. This was a surprise finding since hard wheats are noted for having higher levels of enzyme activity.

It was therefore anticipated that the results of treating hard wheat clears with cyanide would differ with respect to those acheived with the soft clears. In order to achieve a comparable paste viscosity increase with hard wheat flours, it was required to use up to 4 times as much NaCN solution as with soft wheat flours. These are the results of viscosity determinations with a hard wheat clear having 12.62% protein; 1.14% ash, and 12.9% moisture. The viscosities are given as Brabender Units with pastes of 60 grams of flour and 450 grams of water.

| ADDITION OF NaCN | PEAK VISCOSITY (BU) |
|---|---|
| NONE | 280 |
| 0.20% | 390 |
| 0.40% | 580 |
| 0.60% | 660 |
| 0.80% | 850 |

This same clear flour from hard wheat, treated with 800 PPM of silver nitrate, enough to deactivate the amylolytic enzyme content, gave a peak viscosity of 870.

The examples of soft wheat clears and hard wheat clears were repeated with clear flours of lower ash values as well as with patent flours. In all cases, the addition of 10% aqueous sodium cyanide solution at levels up to about 0.40% of available HCN, based on the weight of flour was sufficient to achieve at least about 95% of the maximum paste viscosity. This percentage is of relative value taking the flour viscosity in Brabender Units and dividing this number by the maximum achievable values obtained by the techniques described herein.

It therefore becomes evident that through the selection of wheat flours from various sources and different milling processes, wheat flour pastes of high viscosity can be made by the simple expedient of applying HCN, or alkali metal or alkaline earth metal cyanide water solutions with acid, or other decomposable cyanides in the manner described herein so as to achieve intimate contact of the cyanide with the flour. In addition to achieving elevated peak viscosities, these techniques provide an unusual degree of thermal stability at high temperatures, with stirring. The wheat flours treated with cyanide make possible wheat flour pastes having viscosities within the practical range of pure wheat starch products. Moreover, the resulting modifications render the flours more useful as cereal extenders in plywood glues based on melamine-formaldehyde, urea-formaldehyde and/or phenol-formaldehyde resins, among other industrial uses.

The American Plywood Association has given approval for certain glue applications to include up to 25% percent by weight of cereal extenders based on the weight of the resins, which may be either melamine-formaldehyde, urea-formaldehyde or phenol-formaldehyde. In practice, the adhesive formulations are varied considerably depending on the woods selected, surface finish, eventual use of the finished plywood, etc. Other facts dictating formulations are related to control of glue penetration, tackiness, joint strength and the type of apparatus used in assembling the plywood. The function of the cereal extenders, mostly wheat flours, is mainly to control the final viscosity of the glue mix which in turn affects the glue penetration in the wood surfaces, and the uniformity with which the glue transfers from the glue rolls. In actual field tests, wheat flours wherein the wheat proteins have been modified by the application of cyanide solutions as described hereinbefore deliver much better results and are preferred over flours not so modified.

A phenol-formaldehyde based adhesive including a cyanide treated wheat flour was made up as follows: 1388 parts of a commercial phenol-formaldehyde resin (40% solids by weight) is mixed with 170 parts of a filler (ground nut flour) and 84 parts of wheat flour)(modified with cyanide aqueous solutions). To this mixture is added 56 parts of a 50% NaOH solution; and water up to 307 parts. More water is added if required to obtain the viscosity target. The ingredients are usually combined in a sequence preferred by the formulators, though it is common practice to begin with only a 10 to 20% portion of the resin, and the remainder added as the final step.

In the foregoing recitals, references have been made to "ventilating" of wheat flours processed with NaCN solutions as one method of dissipating some portion or all of the HCN gas, so that the presence of free HCN with the flour would not interfere with the observations as to flour paste viscosities. One of the great surprises of these wheat flour paste tests was to find that merely by spreading out the processed wheat flours in shallow trays, with a flour depth of $\frac{1}{2}$ to $1\frac{1}{4}$ inches or so, for periods of up to 16 hours, the residuals cyanides were always found to be less than 5 PPM, and usually less than 1 PPM. One may conclude therefor, that the activity of HCN appears to modify the flour enzymes systems without actually reacting and becoming apart of the flour. There are several well known tests for residual cyanides. One procedure is cited by KENT-JONES and AMOS: in "MODERN CEREAL CHEMISTRY" Sixth Edition, FOOD TRADE PRESS, LTD. (1967) Page 587, Paragraph 177.

Several enzyme modifications with NaCN solutions were applied to commercial grades of dry milled corn flours. One food grade corn flour assayed 77.1% starch; 1.8% fat; 7.6% protein; 0.45% mineral ash; and 10.5% moisture. When checked on the AMYLO/VISCO/GRAPH, the peak viscosity of 40 grams flour with 450 grams of water, reached a plateau of 250 BU at 86.5° C. With the treatment of the corn flour with only 0.20% of NaCN, a quantity equivalent to 0.10% of HCN, the viscosity of this corn flour reached a peak value of 460 BU. This peak was attained at a temperature of 91.5° C. The cooked paste was smoother and the maximum viscosity was maintained with practically no change while stirring for 10 minutes at 93° C. When this corn flour processed with 0.20% NaCN was ventilated to dissipate some of the HCN gas which was generated, after 16 hours the residual cyanide was found to be only 23 PPM. The flour paste viscosity of 460 BU with the 0.20% NaCN treatment may be compared to a value of 480 BU achieved by the addition of 800 PPM of AgNO$_3$. All viscosity measurements are with a 700 small cmG Cartridge.

Another corn flour checked was one which was separated from "corn mill feeds" so that its content of starch was much lower while it had a high value of fat. This corn flour assayed 68.9% starch; 3.2% fat; 8.2% protein and 1.50% mineral ash. With 40 grams of this "high fat" corn flour in 450 grams of water, the viscosity peak was 140 BU at 93° C. This flour was treated with NaCN in water solutions at 0.10%, 0.20% and 0.40% by weight based on the flour and the peak viscosity was increased to 210 BU with 0.10% NaCN, and failed to go above this value with even more NaCN. Even with the addition of 1000 PPM of AgNO$_3$, to this high fat grade of corn flour, the peak viscosity was 220 BU, a mere 10 BU higher than that obtained with 0.10% NaCN based on the corn flour.

The action of NaCN solutions on grades of milo flours milled for industrial use gave results very comparable to the "high fat" corn flours.

Rye flours appear to offer the most exciting comparisons between the paste viscosity of untreated rye flours produced by normal dry milling procedures, and these same milled dry flours treated with NaCN solutions. For a detailed review of rye flours, refer to "RYE: Production, Chemistry, and Technology" edited by Dr. Walter Bushuk of the University of Manitoba, Winnipeg, Canada. This monograph is published by the American Association of Cereal Chemists Inc.

The main constituents of rye flours are starch, proteins, pentosans, hemicellulose, cellulose, mineral matter and enzymes. Most rye flours have these components in different ratios. While rye flours proteins fail to produce visco-elastic properties similar to those of wheat protein, rye flours exhibit different degrees of "swelling properties" when mixed with water. This swelling or solubilizing property is of major importance in relation to bread making properties.

Three samples of commercial rye flour milled from the same rye grain, identified as LIGHT RYE, MEDIUM RYE and DARK RYE had the following compositions of the principal constituents.

|  | (1) LIGHT RYE FLOUR | (2) MEDIUM RYE FLOUR | (3) DARK RYE FLOUR |
|---|---|---|---|
| ASH | 0.79% | 0.95% | 2.40% |
| PROTEIN | 8.0 | 8.4 | 13.1 |
| MOISTURE | 12.8 | 12.7 | 11.9 |
| SOLUBLES | 15.1 | 16.1 | 23.4 |

The value of "solubles" listed is not one generally incorporated in the specifications for rye flours. These were determined as a separate item because of their significance in measuring the initial viscosity of each flour, and tracing the changes occuring in the pastes upon the addition of NaCN solutions.

In applying the qualitative tests for enzymes using solutions of GUAIACOL and hydrogen peroxide, it was evident rye flours were charged with unusually high levels of enzyme activity. This merely confirmed the general views of the "Rye experts". With this in mind it seemed better to test the viscosity of each grade of rye (1), (2) and (3) at 60 grams of flour with 450 grams of water; the usual ratio used for wheat flours. Having this "control value" and the shape of the AMYLOGRAPH curve, the probable maximum viscosities using AgNO$_3$ as an enzyme system inhibitor or modifier was established. After these values were determined, various additionss of NaCN solution were made until the maximum viscosity values were obtained. The targeted maximum was at least 90% of the BU level observed through the application of AgNO₃ at 1200 PPM level.

The results are given in the following table for all three rye flours — (1) LIGHT: (2) MEDIUM: and (3) DARK:

| VISCOSITIES IN BRABENDER UNITS — (BU) | | | |
|---|---|---|---|
| Addition to Flours | (1) Light | (2) Medium | (3) Dark |
| None—Start Point — 40° C | 30 | 30 | 30 |
| None—Peak and Temp. | 160(73° C.) | 160(73° C.) | 110(72° C.) |
| AgNO₃—Start Point — 40° C. | 30 | 40 | 100 |
| AgNO₃—Peak and Temp. | 1090(93° C.) | 1210(93° C.) | 500(90° C. |
| NaCN— 0.10% | 980 | 1050 | 440 |
| 0.20% | 1015 | 1060 | 470 |
| 0.30% | 1050 | 1090 | 470 |
| 0.40% | 1065 | 1130 | 475 |

The above table reveals how the addition of NaCN solutions increases the viscosity values of rye flours. There are some very important observations which may offer great significance yet are not apparent from the table. For one thing, the action of the HCN generated by the NaCN solutions applied to the rye flour seems almost immediate. Samples of flours taken right after treatment and ventilated in a stream of air for 15 minutes show viscosity changes equal to those listed in the table. Furthermore, the rye flour pastes made with NaCN treated flours have an unusual degree of tackiness and clarity. In fact, the pastes have a "sparkle" not unlike the "amioca starches" used to thicken pie fillings. Rye flours processed with NaCN should offer exceptional values in adhesive applications where low gel temperatures, high viscosity and high tack are desired.

From the 70° C. level where the paste viscosities are in the range of 200–280 BU, until the maximum values of 1065–1130 BU are reached (for the LIGHT and MEDIUM RYE FLOURS) the increases in paste viscosity is almost a straight line to the point of the maximum value. This phenomenon was not observed in any flours except with rye flours.

It is not clear why the addition of alkaline agents such as NaCN, capable of releasing HCN to act on cereal flours appears to bring about these great increases in paste viscosities. The changes observed in these HCN treated flours are dramatic, yet there seems to be little if any, decrease in overall enzyme activity. Furthermore, the amylographs comparing the flours treated with NaCN and those treated with the addition of AgNO₃ solutions seem almost identical in shape and extent. It is usual for the modified cereal flour products of this invention to have maximum paste viscosities at least about 50% higher than the untreated flours.

What is claimed is:

1. A method of improving the physical properties of cereal flours which comprises treating such cereal flours with gaseous cyanide for at least about 10 minutes which is a time sufficient to produce a modified cereal flour having an elevated paste viscosity.

2. A method as claimed in claim 1 wherein the gaseous cyanide is hydrogen cyanide in a proportion of about 500 to 10,000 parts per million by weight based on the weight of flour, at a temperature of about 2° C.–40° C.

3. A method as claimed in claim 1 wherein the cereal is corn, rye, wheat, milo or mixtures thereof.

4. A method as claimed in claim 1 comprising contacting said flours with aqueous alkali metal or alkaline earth metal cyanides under conditions effective to convert such to gaseous cyanide in situ.

5. The process claimed in claim 1 wherein said treating time is about 15 minutes to 2 hours.

6. The cereal flour product of the process of claim 1.

7. A cereal flour paste having a maximum viscosity at least about 50% higher produced by treating said paste with cyanide as compared to the maximum viscosity of an otherwise identical cereal flour paste which had not been treated with cyanide.

* * * * *